B. E. D. STAFFORD AND E. I. DODDS.
STAYBOLT STRUCTURE.
APPLICATION FILED SEPT. 10, 1919.
1,392,235.
Patented Sept. 27, 1921.
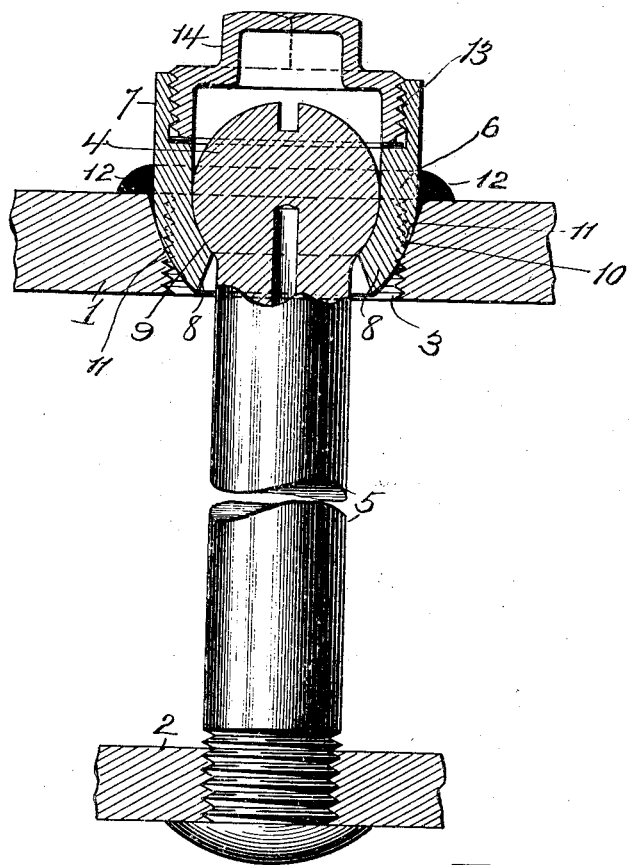
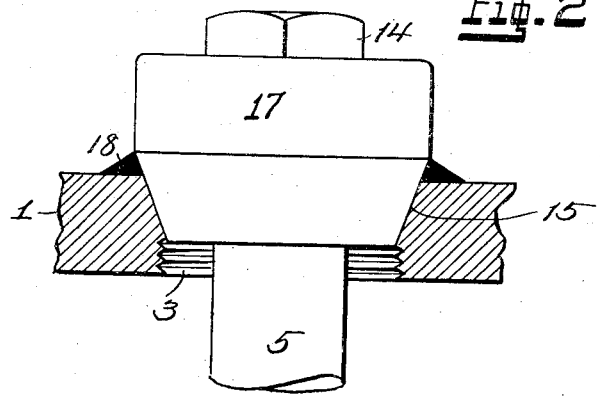
INVENTORS
B. E. D. Stafford
E. I. Dodds
By Seymour & Bright Attorneys

UNITED STATES PATENT OFFICE.

BENJAMIN E. D. STAFFORD AND ETHAN I. DODDS, OF PITTSBURGH, PENNSYLVANIA, ASSIGNORS TO FLANNERY BOLT COMPANY, OF PITTSBURGH, PENNSYLVANIA.

STAYBOLT STRUCTURE.

1,392,235. Specification of Letters Patent. Patented Sept. 27, 1921.

Application filed September 10, 1919. Serial No. 322,879.

*To all whom it may concern:*

Be it known that we, BENJAMIN E. D. STAFFORD and ETHAN I. DODDS, citizens of the United States, and residents of Pittsburgh, in the county of Allegheny and State of Pennsylvania, have invented certain new and useful Improvements in Staybolt Structures; and we do hereby declare the following to be a full, clear, and exact description of the invention, such as will enable others skilled in the art to which it appertains to make and use the same.

This invention relates to improvements in staybolt structures for boilers,—one object of the invention being to provide a staybolt structure in which a bearing sleeve or member having a smooth bearing face may be initially mounted freely on a seat formed in an opening in the boiler sheet and afterward welded to the boiler sheet and to shape the wall of an opening in the boiler sheet which had been previously occupied by a threaded bearing sleeve, to provide the smooth bearing face of the bearing member.

A further object of the invention being to provide a staybolt construction embodying a universally movable sleeve for effecting correct alinement of a staybolt with its points of connection with the respective boiler sheets, and in which said sleeve shall have a rounded portion and adapted to bear on a curved seat formed in the wall of an opening in the boiler sheet which had previously been occupied by a threaded bearing sleeve.

A further object is to so mount a rounded bearing sleeve or bushing on a seat formed in the wall of an opening which had previously been occupied by a threaded bearing sheet, that said rounded sleeve or bushing shall have a wide range of adjustment to insure proper alinement of the staybolt whether the respective boiler sheets be parallel or at an angle to each other, thus adapting the staybolt structure for connecting parallel sheets or for connecting an inclined roof or crown sheet with a horizontal fire box sheet, and to so secure the bushing to the boiler sheet as to hold it securely in adjusted or "set" position and guard against leakage.

With these and other objects in view, the invention consists in certain novel features of construction and combinations of parts as hereinafter set forth and pointed out in the claim.

In the accompanying drawing Figure 1 is a sectional view illustrating an embodiment of our invention, and Fig. 2 is a view of a modification.

1 represents an outer boiler sheet and 2 the inner sheet of a boiler, the former having an opening 3 for the reception of a mounting for the head 4 of a staybolt 5, and the inner sheet having a suitable opening to permit the inner end of the bolt to be suitably secured to said inner boiler sheet.

The outer boiler sheet shown in the drawing represents an outer sheet of a boiler which has been in use and which had been equipped with threaded bearing sleeves for the bolt heads and the wall of the opening 3 is shown as having been threaded to accommodate a threaded sleeve.

Many staybolt structures of the threaded bearing sleeve type have been installed in boilers and it is desirable, when repairing boiler constructions employing the threaded sleeve type of staybolt structures (as when a new inner sheet is being installed or when some accident has occurred which renders the replacing of bolts necessary,) to substitute bearings which are universally movable or adjustable, for the threaded sleeves previously employed.

In the present instance we employ a sleeve or bushing 6 having a portion 7 which may be straight and approximately cylindrical and an inner end portion 8 which is rounded and affording an interior rounded seat 9 for the rounded head 4 of the staybolt 5 and an exterior curved face 10 to have a universally movable mounting on the boiler sheet.

After the previously used threaded sleeve or bushing shall have been removed, a portion of the wall of the opening 3 will be reamed so as to provide a tapering rounded seat 11 which will conform to the contour of the curved or rounded exterior face 10 of the sleeve and against which said sleeve has a universally movable seat or bearing.

With our improved construction, the sleeve 6 is capable of a wide range of universal movement to insure correct alinement of the bolt with its points of connection with the respective boiler sheets, whether said sheets be parallel or at an angle to each other.

When the bearing sleeve or bushing shall have become correctly "set" or adjusted to insure proper alinement of the staybolt, it will be securely and integrally united to the boiler sheet with the use of a weld 12 surrounding said sleeve.

The threaded end portion of the sleeve or bushing 6 is threaded as at 13 for the reception of a plug or closure 14.

In the construction shown in Fig. 2, the previously threaded opening 3 in the boiler sheet is so reamed out as to provide a smooth tapering wall 15 and a straight tapering portion 16 of a bearing member 17 is mounted on the seat formed by the said tapering portion 15 of the wall of the opening in the boiler sheet. The bearing member 17 is welded to the boiler sheet as shown at 18.

Having fully described our invention what we claim as new and desire to secure by Letters-Patent, is:—

In a staybolt structure, the combination of a boiler sheet having an opening, a part of the wall of which is reamed forming an enlarged tapering portion, a bearing sleeve having a tapering portion entering said opening and bearing on the enlarged tapering portion thereof, the inner end of said bearing sleeve terminating in the contracted inner end portion of the opening in the boiler sheet and the outer part of said bearing sleeve projecting outwardly beyond the outer face of the boiler sheet, a staybolt having a head mounted in said bearing sleeve, and a weld surrounding the outwardly projecting part of the bearing sleeve and uniting the latter to the boiler sheet.

In testimony whereof we have signed this specification in the presence of two subscribing witnesses.

BENJAMIN E. D. STAFFORD.
ETHAN I. DODDS.

Witnesses:
HOWARD O. CAPPEL,
EDWIN S. RYCE.